Figure 1:
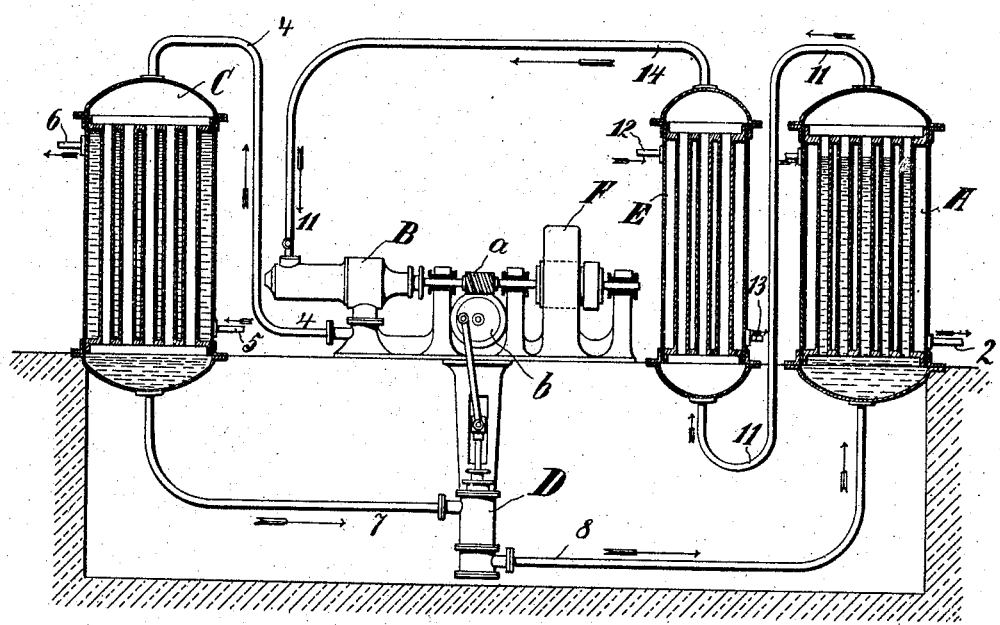

No. 781,481. PATENTED JAN. 31, 1905.
F. WINDHAUSEN, Jr.
METHOD OF PRODUCING MOTIVE POWER.
APPLICATION FILED MAR. 15, 1901.

2 SHEETS—SHEET 1.

Witnesses:

Inventor
Franz Windhausen Jr
By
James L. Norris
Atty

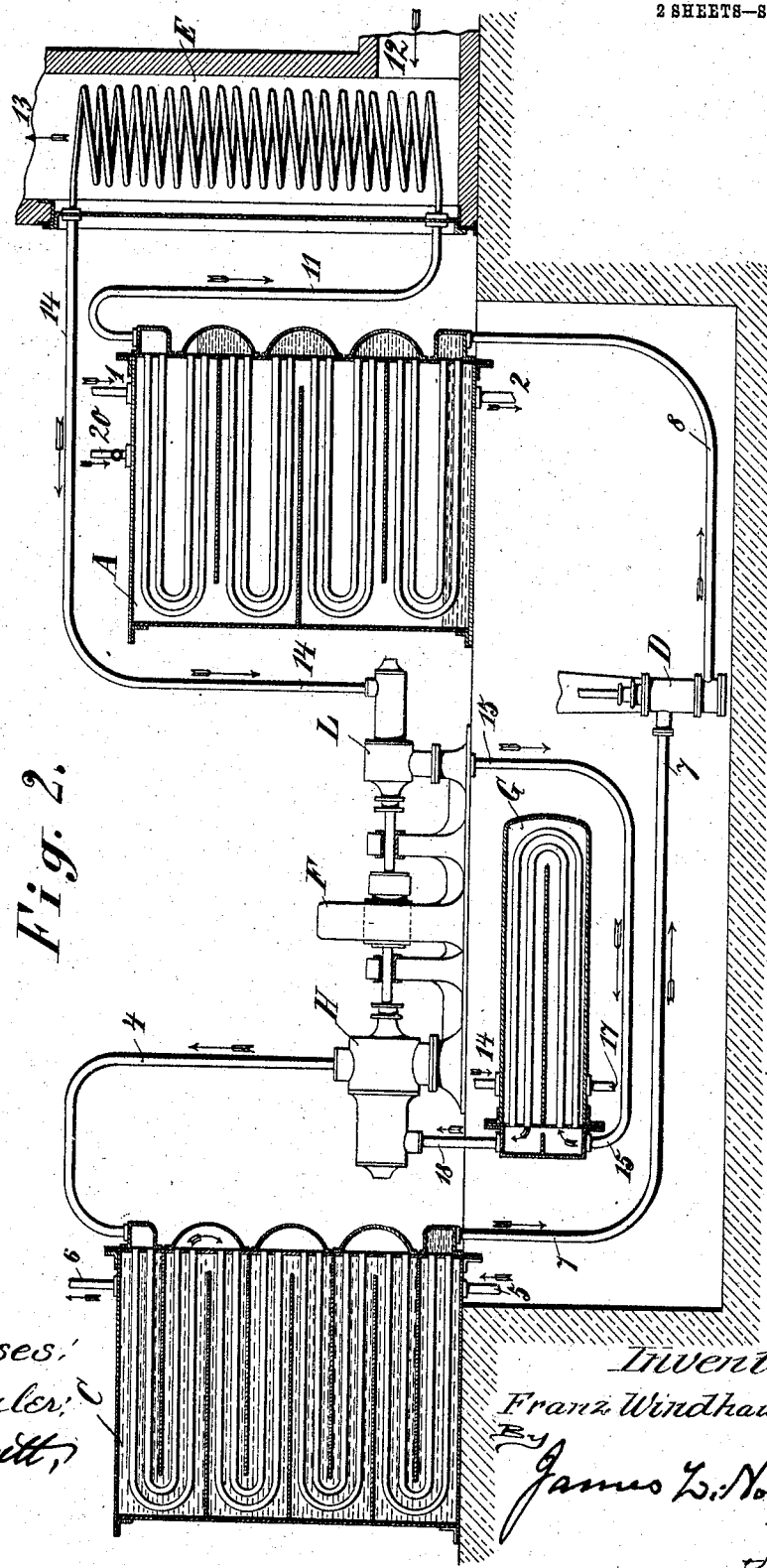

No. 781,481. Patented January 31, 1905.

UNITED STATES PATENT OFFICE.

FRANZ WINDHAUSEN, JR., OF BERLIN, GERMANY.

METHOD OF PRODUCING MOTIVE POWER.

SPECIFICATION forming part of Letters Patent No. 781,481, dated January 31, 1905.

Application filed March 15, 1901. Serial No. 51,321.

*To all whom it may concern:*

Be it known that I, FRANZ WINDHAUSEN, Jr., a subject of the Emperor of Germany, and a resident of 13 Kurfürstendamm, Berlin, in the German Empire, have invented a new and useful Method of Producing Motive Power, of which the following is a specification, reference being had to the accompanying drawings, forming a part thereof.

The object of this invention is the utilization of the heat present in exhaust-steam, waste gases, water of condensation, &c., as a source of motive power in a turbine arrangement. For this purpose the exhaust-steam, waste gases, or the like are conveyed to an evaporator—for instance, a coil—in order by means of the heat which they contain to vaporize a fluid the boiling-point of which under atmospheric pressure is below 0° centigrade—for instance, ammonia, sulfurous acid, carbonic acid, &c. The vapors of such fluids at relatively low temperature have a high degree of pressure. For instance, at a temperature of 55° centigrade in the evaporator the pressure of the saturated vapors of ammonia is twenty-three atmospheres, of sulfurous acid 9.5 atmospheres, and of carbonic acid one hundred and twenty atmospheres. The cold vapors thus formed are then allowed to expand in a Parsons, Laval, or other suitable steam-turbine (thereby producing power) to a degree of expansion at which they can be liquefied in a condenser by cooling-water at ordinary temperature. For example, at 20° centigrade the ammonia-vapors are liquefied at eight atmospheres, those of sulfurous acid at 3.8 atmospheres, and those of carbonic acid at sixty atmospheres. After the condensation has been effected the liquid ammonia or the like is returned to the evaporator by a suitable feed apparatus, (pump or injector,) where it is again vaporized.

Several forms of cold-vapor-turbine arrangements or apparatus by which my new and improved method for producing motive power are shown on the accompanying drawings, in which—

Figure 1 is a sectional diagram showing an arrangement of parts suitable for the practice of my invention. Fig. 2 shows a diagrammatic sectional view of a modified form of the arrangement of Fig. 1, in which the vapors are twice superheated and twice expanded in a compound turbine.

Like characters of reference denote similar parts throughout both figures.

The exhaust-steam or the like enters, through the pipe 1, the evaporator A, in which it gives off its heat to the ammonia or other fluid in the pipes. The water of condensation thereby formed passes through the pipe 2 into the open air or flows to an air-pump. (Not shown.) The cold vapors thus produced flow through the pipe 11 into a superheater E and are superheated directly by furnace-gases or indirectly by steam or other heating medium which enters through the pipe 12 and passes out through the pipe 13. The superheated vapors pass through the pipe 14 to the cold-vapor turbine B, expanding therein and producing motive power. The expanded vapors flow through the pipe 4 into the condenser C, where they are condensed by cooling-water. The condensed vapors from the condenser C are conveyed, by means of the feed-pump D, through the pipes 7 and 8 back to the evaporator A in order to be vaporized afresh.

F represents a dynamo driven by the cold-vapor turbine.

The condenser C is provided with an inlet-pipe 5 and an outlet-pipe 6 for the cooling medium.

Instead of the high-tension cold vapors produced in the evaporator A expanding in only one turbine, as represented in Fig. 1, this expansion may also be effected in two or more turbines of different capacity, according to the compound or triplex system. In this case the cold vapors when passing from the first or high-pressure turbine to the second or low-pressure turbine, &c., may also be heated afresh before the following expansion. Such a compound cold-vapor-turbine arrangement is represented in Fig. 2, in which the cold vapors are directly superheated by means of furnace-gases and the cold vapors leaving the turbine of smaller capacity are heated again before their final expansion in the second larger turbine.

Waste gases or the like enter the evaporator A through pipe 1, heat and vaporize the ammonia or the like circulating through the ⊂-shaped pipe system, the waste gases or the like passing off from the evaporator A through pipe 2 or are drawn off by an air-pump. (Not shown.) The cold vapors thus produced pass through the pipe 11 to the superheater E, wherein they are superheated by means of furnace-gases or the like admitted at 12 to the superheater E and discharged at 13. The superheated high-pressure cold vapors are conveyed through the pipe 14 into the high-pressure cold-vapor turbine L, expand therein, and pass through the pipe 15 into the receiver G in order to be heated again by means of any source of heat—for instance, live steam entering through pipe 16 and leaving through pipe 17—and then flow through the pipe 18 into a second low-pressure turbine H of greater capacity. After having expanded therein they are conveyed through the pipe 4 into the condenser C. Here the vapors are condensed by means of cooling-water passing the pipe system in counter-current and entering through pipe 5 and leaving through pipe 6. The condensed vapors are returned in a liquid state, by means of pump D, through pipes 7 and 8 to the vaporizers.

If the cold-vapor turbines above described are driven by means of superheated cold vapors, their working will be the more economical the higher the vapors are superheated beyond their temperature of saturation, (evaporator temperature.) This evaporating temperature usually being comparatively low (about 50° to 70° centigrade) on account of the low boiling-point of the working liquid, a very high superheating of the cold vapors may take place without any damage of the machines; but this very high superheating of the cold vapors may not be completely made use of in consequence of the proportionately little difference of the pressure of the evaporator and condenser or in consequence of the little difference of temperature resulting by the expansion of the vapors from the pressure of the evaporator to that of the condenser, and therefore it may happen that the expanded cold vapors enter the condenser in a still highly-superheated state and that here the retained superheating heat has to be destroyed by the cooling-water without yielding motive power. In order to avoid this disadvantage, I proceed as follows: The high-pressure cold vapors produced in the evaporator are conveyed to a regenerator, in which they are heated according to the counter-current system by means of the still superheated cold vapors passing from the turbine to the condenser, then enter a superheater in order to be so highly superheated that they are in a still superheated state after their expansion in one or more turbines, then pass to the regenerator, where they heat the cold vapors flowing from the evaporator to the superheater, thereby being cooled, and at length enter the condenser at about their evaporator temperature in order to be returned to the evaporator after their condensation. The expanded cold vapors passing from the regenerator to the condenser and still having nearly evaporator temperature may also be used to heat liquid ammonia or the like fed by means of the pump into the evaporator.

It needs no mention that the cold-vapor turbine, according to Figs. 1 and 2, may be coupled in a suitable manner with a steam-turbine furnishing the waste steam.

In order to avoid loss of heat by condensation and for the purpose of more economically making use of the heat available, the cold-vapor turbines may be provided with a jacket (not shown) in which steam or any other heating medium is caused to circulate.

It is obvious that the cold-vapor turbines and the other parts of the machine have to be provided with suitable regulating contrivances, safety-valves, fittings, and the like.

The different arrangements represented only diagrammatically in the drawings show some apparatus in which to carry out my invention. The evaporator, superheater, condenser, &c., of course may also be of any other suitable form or construction.

Having now particularly described and ascertained the nature of my said invention and in what manner the same is to be performed, I declare that what I claim is—

1. The herein-described method of producing motive power from exhaust-steam, waste gases and the like which consists in vaporizing by the heat of exhaust-steam, waste gases and the like cold-vapor liquids having a boiling-point below 0° centigrade under atmospheric pressure, expanding the vapors thus produced in an elastic-fluid working turbine, superheating said vapors by exhaust-vapors, expanding the said superheated vapors in a larger elastic-fluid working turbine, cooling and condensing said vapors and then evaporating afresh the liquids thus obtained, substantially as herein described and for the purpose set forth.

2. The herein-described method of producing motive power from exhaust-steam, waste gases and the like which consists in vaporizing by the heat of exhaust-steam, waste gases and the like cold-vapor liquids having a boiling-point below 0° centigrade under atmospheric pressure, superheating the vapors thus produced in a suitable manner, expanding said superheated vapors in an elastic-fluid working turbine, superheating said vapors a second time, expanding said superheated vapors in a larger elastic-fluid working turbine, cooling and condensing said vapors and then evaporating afresh the liquids thus obtained, substantially as herein described and for the purpose set forth.

3. The herein-described method of producing motive power from exhaust-steam, waste gases and the like which consists in vaporizing by the heat of exhaust-steam cold-vapor liquids having a boiling-point below 0° centigrade under atmospheric pressure, superheating the vapors thus produced by exhaust-vapors, expanding said superheated vapors in a suitable manner, cooling and condensing said vapors, and then evaporating afresh the liquids thus obtained.

4. The herein-described method of producing motive power from exhaust-steam, waste gases and the like which consists in vaporizing by the heat of the exhaust-steam cold-vapor liquids having a boiling-point below 0° centigrade under atmospheric pressure, superheating the vapors thus produced in a suitable manner, expanding said superheated vapors, superheating said vapors, expanding said superheated vapors, cooling and condensing said vapors, and then evaporating afresh the liquids thus obtained, substantially as herein described and for the purpose set forth.

In witness whereof I have hereunto set my hand in presence of two witnesses.

FRANZ WINDHAUSEN, Jr.

Witnesses:
   WOLDEMAR HAUPT,
   HENRY HASPER.